2,987,499
POLYMERIZABLE COMPOSITIONS COMPRISING UNSATURATED POLYESTER RESINS AND N-VINYL PYRROLIDONES
Jesse Werner, Holliswood, N.Y., and Robert Steckler, Chagrin Falls, Ohio, assignors to General Aniline & Film Corporation, New York, N.Y., a corporation of Delaware
No Drawing. Filed Aug. 5, 1957, Ser. No. 676,428
6 Claims. (Cl. 260—45.4)

The present invention relates to thermosetting compositions comprising unsaturated polyester resins, and N-vinyl pyrrolidones as cross-linking monomers which, when catalyzed, will thermoset to infusible solids having improved adhesion to glass and related products.

It is known that the reaction of polyhydric alcohols with polybasic acids produces a class of resinous materials which are called polyester resins. When at least part of these alcohols, or acids, contain one or more double bonds, the resulting polyester is capable of cross-linking with other unsaturated materials through the reactive double bonds, thereby forming three dimensional cross-linked structures, which are characteristic of thermosetting resins. The polybasic acids and polyhydric alcohols used in these preparations of polyesters can all be unsaturated or a blend of unsaturated and saturated materials can be used. These variations permit the preparation of a large number of unsaturated polyesters with a wide range of properties. The number of variations possible are still further increased by the wide variety of unsaturated monomers used to cross-link the polyester resin.

Various polymerizable monomers have been suggested, such as, for example, styrene, methyl methacrylate, diallyl phthalate, diallyl fumarate, triallyl cyanurate, vinyl acetate, vinyl chloride, acrylic acid and its derivatives, vinyl phenols, polyallyl esters, e.g. diallyl ethylene glycol dicarbonate, diallyl dichlorosilane, ethyl vinyl ether, methyl vinyl ketone, vinyl pyridines, etc.

The principal disadvantage of the foregoing monomers, when mixed with polyester resins and then cured, is that the resulting cured resin has poor adhesion to glass cloth, glass fibers and the like. This is particularly apparent when any vinyl pyridine is employed as the cross-linking agent. If glass cloths or glass fibers are impregnated with such resins and built into laminates, followed by curing, they do not exhibit the preferred flexural strength.

It is an object of the present invention to overcome the foregoing difficulties and to provide a new class of polymerizable monomers as cross-linking agents for unsaturated polyesters having the unexpected property of promoting the adhesion of the cured resins to glass cloth, glass fibers and the like.

The proper adhesion of the resin to glass fibers and the like is essential to obtain maximum physical properties. In the past, this has been partially accomplished by preheating the glass fibers and like with products, such as vinyl silanes. The practice of the present invention does not necessitate pretreatment and allows the preparation of glass fiber laminates and like products with a maximum of physical characteristics. The importance of improving physical properties cannot be overstressed, since this is a very important factor in the glass laminating industry. In accordance with the present invention, it is possible to increase the flexural strength of glass fiber laminates by as much as 100%, by cross-linking any one of the commercially available unsaturated polyesters with a vinyl pyrrolidone alone or a mixture thereof containing styrene or any one of the currently used cross-linking agents, except vinyl pyridines. It is thus possible for laminates requiring a specified flexural strength to be now produced with fewer glass plies than previously required, and thereby reduce the weight of these laminates in the finished product. The possible reduction in weight is of prime importance, particularly in aircraft construction.

Other objects and advantages will become apparent from the following description.

We have discovered that polymerizable unsaturated polyester resins obtained by the condensation of unsaturated or saturated polyhydric alcohols with unsaturated polycarboxylic acids, containing 5 to 20% by weight of the resin of an N-vinyl pyrrolidone, after catalyzing and curing, yield a resin having extremely high adhesion to glass cloth, glass fibers, glass sheets, and other structural materials fabricated from glass fibers or glass cloth as evidenced by greatly improved flexural strength and modulus even after prolonged water immersion. In some cases over 100% increase in flexural strength is obtained.

The use of the N-vinyl pyrrolidones and the obtainment of the improved properties, after prolonged water immersion, is surprising and totally unexpected since the N-vinyl pyrrolidones, and their homopolymers, are water soluble. Vinyl pyridines are water insoluble and hence not within the scope of this invention.

The monomers of N-vinyl pyrrolidones are completely different from those used in the prior art. They react with various unsaturated polyester resins during conventional curing cycles and become a permanent part of the cured object. The presence of the copolymerized N-vinyl pyrrolidone in the polyester resin greatly improves the adhesion of the resin to other plastics, and especially the adhesion of polyesters to glass in its various forms.

The N-vinyl pyrrolidones employed in accordance with our invention are characterized by the following general formula:

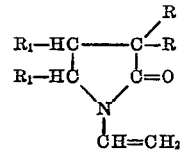

wherein R represents either hydrogen or methyl groups and $R_1$ represents either hydrogen, methyl or ethyl groups.

As specific illustrations of the above compounds, the following may be mentioned:

N-vinyl-2-pyrrolidone
N-vinyl-5-methyl pyrrolidone
N-vinyl-5-ethyl pyrrolidone
N-vinyl-3,3-dimethyl pyrrolidone
N-vinyl-3-methyl pyrrolidone
N-vinyl-4-methyl pyrrolidone
N-vinyl-4-ethyl pyrrolidone It is to be noted at the outset that in the practice of our invention, the constitution of the polyesters is immaterial so long as they are of the unsaturated type.

The art is replete with various literature and patent references on the preparation of such unsaturated polyester resins. The simplest members of this group of resins are those produced by the condensation of $\alpha,\beta$-unsaturated organic acids with a polyhydric alcohol of either aliphatic or aromatic origin, preferably those containing primary hydroxyl groups.

As illustrative examples of the components entering the preparation of unsaturated polyesters which may be cross-linked in accordance with our invention to give resins having the foregoing desirable characteristics, the following acids, alcohols and mixture of acids are illustrative.

ALIPHATIC POLYHYDRIC ALCOHOLS

Ethylene glycol
Propylene glycol
Trimethylene glycol
Triethylene glycol
Pentaethylene glycol
Polyethylene glycol
1,4 butanediol
Diethylene glycol
Dipropylene glycol
2,2-dimethyl-1,3-propanediol
Hexamethylene glycol

AROMATIC POLYHYDRIC ALCOHOLS

Xylylene alcohols
Ethyl resorcinol
Propyl resorcinol
2,4-dimethyl resorcinol
3,6-dimethyl-1,2,4-benzenetriol
Ethyl pyrogallol
2-methyl-1,4-dihydroxy naphthalene
3-methyl-1,4,5-naphthalenetriol
Dimethylol toluene
Dimethylol xylene
Bis hydroxy ethyl or bis hydroxy propyl ethers of resorcinol, catechol, hydroquinons
1,5-dihydroxynaphthalene
4,4'-isopropylidene bis phenol, etc.

UNSATURATED DIBASIC ACIDS AND ANHYDRIDES

Maleic acid
Ethyl maleic acid
Maleic anhydride
Citraconic acid
Muconic acid
Fumaric acid
Aconitic acid
Mesaconic acid
Itaconic acid

SATURATED DIBASIC ACIDS

Adipic acid
Azelaic acid
Sebacic acid
Dodecyl succinic acid
Succinic acid
Tetrachlorophthalic anhydride
Hexahydrophthalic anhydride
1,4,5,6,7,7-hexachlorobicyclo-(2.2.1)-5-heptane-2,3-dicarboxylic anhydride
Malic acid
Citric acid In addition to the foregoing dibasic acids and anhydrides, phthalic anhydride may also be employed.

The polyesters preferred in accordance with the invention are those that are obtained by esterifying an unsaturated polybasic acid with a polyhydric alcohol. A part of the unsaturated acid may be replaced by a saturated polybasic acid. In other words, a mixture of saturated and unsaturated polycarboxylic acids will form an unsaturated polyester amenable to cross-linking with an N-vinyl pyrrolidone.

The proportions of the unsaturated polybasic acids, chlorinated derivatives or anhydrides thereof, or mixtures of saturated and unsaturated polycarboxylic acid with polyhydric alcohols, are not critical, and the proportions may be varied to any extent as long as a resinous polyester, preferably having an acid number below 60 is obtained. Polyesters having an acid number between about 5 and 50 are preferred.

Illustrative examples of the ratios of polybasic acid and polyhydric alcohol which, when esterified will yield an unsaturated resinous product having the desired acid number are as follows:

1

| | Moles |
|---|---|
| Maleic anhydride | 15 |
| Ethylene glycol | 16.5 |

2

| | Moles |
|---|---|
| Maleic anhydride | 10 |
| Diethylene glycol | 11 |

Polyesters prepared from mixtures of dibasic acids and mixtures of glycols:

1

| | Moles |
|---|---|
| Maleic anhydride | 7.5 |
| Phthalic anhydride | 2.5 |
| Ethylene glycol | 2.75 |
| Diethylene glycol | 8.25 |

2

| | Moles |
|---|---|
| Maleic anhydride | 6.25 |
| Phthalic anhydride | 3.75 |
| Ethylene glycol | 5.25 |
| Diethylene glycol | 5.25 |

3

| | Moles |
|---|---|
| Fumaric acid | 4 |
| Phthalic anhydride | 8 |
| Ethylene glycol | 12.6 |
| Pentaerythritol | 0.15 |

4

| | Moles |
|---|---|
| Maleic anhydride | 7.0 |
| Phthalic anhydride | 1.5 |
| Adipic acid | 1.5 |
| Ethylene glycol | 5.5 |
| Diethylene glycol | 5.5 |

5

| | Moles |
|---|---|
| Maleic acid | 10 |
| Ethylene glycol | 6 |
| Isopropylidene bis-(p-phenylene-oxypropanol-2) | 4.5 |

The foregoing formulations are condensed by the usual polyester condensation procedure until the acid number is below 50. The reaction mixture is then cooled, and an inhibitor such as hydroquinone, resorcinol, pyrogallol, aniline, phenylene diamines, benzaldehyde and the like may be employed. The amount may range in the order of 0.1 to 10% by weight of the resin.

The proportion of an N-vinyl pyrrolidone employed as a cross-linking agent may range from 5 to 20% by weight of the resin. For practical purposes, we have found that 10 to 15% by weight of the resin is sufficient to cross-link the polyester to the infusible, insoluble stage and yield, after curing, a resin having particularly good adhesion to glass.

The N-vinyl pyrrolidones can be employed as the sole cross-linking agents, or as a mixture with conventional cross-linking agents, such as styrene, vinyl toluene, acrylonitrile, diallyl phthalate, etc., except vinyl pyridines. In such admixture they also give good overall results as will be shown hereinafter.

The polyester resin containing the cross-linking agent or mixtures thereof is cured by the addition of the usual curing catalyst which includes organic peroxides, peracids, hydroperoxides, and the like. Compounds of this type include benzoyl peroxide, lauroyl peroxide, tertiary butyl perbenzoate, 1,1'-hydroperoxy diglycol, hexyl peroxide, methyl ethyl ketone peroxide, tertiary butyl peroxide and the like. In addition to the foregoing catalysts, accelerators such as dimethyl aniline, diethyl aniline, dimethyl-p-toluidine or any other suitable catalyst known to the art may be employed to increase the effect of the catalyst in the polyester resin. The quantity of accelerator may range from 0.1 to 5% by weight of the polyester resin.

The unsaturated polyesters prepared as above, or those which are commercially available may, after the addition of the N-vinyl pyrrolidone, with or without the presence of other monomers (other than vinyl pyridines), together with catalyst, accelerator, or promoter, filler and the like, be employed in casting, laminating or molding operations in accordance with established techniques.

When any one of the foregoing listed vinyl pyrrolidones are added in the proportions of 5 to 20% by weight of the unsaturated polyester, they impart also the unusual and unexpected property of reducing the air sensitivity of the polyester resin which results in ease of handling.

By the incorporation of N-vinyl pyrrolidones alone or with the conventional cross-linking agents, it is possible to produce a final product with the same strength characteristics, but at reduced wall thickness, thereby resulting in an appreciable weight saving in the resin-glass laminate or reinforced plastic. In structural applications, such as automobile bodies, luggage, and the like, the increased flexural strength and modulus resulting from the use of the N-vinyl pyrrolidone alone or in admixture with prior art cross-linking agents (except vinyl pyridines) will permit the use of thinner laminates, resulting in weight reductions, coupled with reduced cost.

The following examples will illustrate the manner in which the present invention may be practiced. They will show the advantages that are obtained by using the N-vinyl pyrrolidones alone and in admixture with some of the prior art cross-linking agents. All the parts given are by weight.

Example I

Into a 5-liter 3-necked flask equipped with a stirrer and thermometer, condenser and dropping funnel (assembled as in the conventional azeotropic process) 6 moles of ethylene glycol were charged, agitation started, and a slow stream of nitrogen gas introduced. The flask was heated to approximately 100° C. and isopropylidene bis-(p-phenylene-oxypropanol-2) was added, followed by 10 moles of maleic acid. The trap adjacent to the reflux condenser was filled with xylene, and slowly additional xylene was added, totaling about 5% of the original charge. The temperature was increased to 150° C. in about one hour and reflux established. The temperature was held so that the rate of distillation of xylene was about 5 cc. per hour until 190° C. had been reached. Thereafter the temperature was held at 190° C. until the acid number was below 50. The trap was emptied, and vacuum applied to remove xylene. The vacuum was maintained at 100–200 mm. mercury residual pressure until the acid number was about 35. The polyester thus obtained was dissolved in styrene in a ratio of 45 parts resin and 55 parts of styrene and was then divided into three equal portions. The first portion was used as a standard. To the second portion, 10 parts by weight of styrene were added to 100 parts of the resin solution. To the third portion, 10 parts of N-vinyl-2-pyrrolidone per 100 parts of resin solution were added. To all three portions, which included the blank control, one part by weight of benzoyl peroxide was added as a catalyst.

Three separate laminates were prepared by impregnating and laying up one by one 20 layers of No. "181 Volan" glass fabric with each one of the above polyester solutions in a wooden frame, ¼ inch thick. The laminates were cured in an oven between glass plate panels, using mylar separators, overnight at 60° C. The oven temperature was then raised to 120° C. during one hour, and the laminates removed from the oven after an additional hour at 120–125° C. The physical characteristics of the three laminates are shown in Table 1.

TABLE 1
[STANDARD]

| | Parts by Weight | | |
|---|---|---|---|
| | 1 (Blank Control) | 2 | 3 |
| Polyester resin solution of Example I | 100.0 | 100.0 | 100.0 |
| Styrene | | 10.0 | |
| N-Vinyl-2-Pyrrolidone | | | 10.0 |
| Benzoyl Peroxide | 1.0 | 1.0 | 1.0 |
| Average Flexural Strength (ASTM D-790-49T): | | | |
| Dry | 18,350 | 16,490 | 40,996 |
| Wet | 15,325 | 19,975 | 36,800 |
| Modulus: | | | |
| Dry | 959,000 | 785,000 | 1,483,000 |
| Wet | 601,500 | 737,500 | 1,440,000 |

Example II

A polyester of one mole fumaric acid and 1.1 moles bis hydroxy propyl ether of bis phenol A was prepared, using the same type of equipment and procedure outlined in Example I. The heating was continued until an acid number of below 35 was obtained. The resulting resin was hard and brittle at room temperature. It was dissolved in benzene to form a 50% solution, which was moderately viscous. Cross-linking agents and catalyst were added to several portions of this resin solution to give ratios shown in Table 2, and fiberglass mat, impregnated with resin solution to give, after evaporation of the benzene, a resin to glass ratio of one to one. Layups were prepared as in Example I and pressed for five minutes at 300° F. in a matched metal die. The results obtained are shown in Table 2.

TABLE 2

| | 1 | 2 |
|---|---|---|
| 50% Polyester resin solution of Example II | 170 | 170 |
| N-Vinyl-2-Pyrrolidone | | 5 |
| Diallyl Phthalate | 15 | 10 |
| Tert. Butyl Perbenzoate | 4 | 4 |
| Flexural Strength, ASTM D-790-49T: | | |
| Dry | 20,550 | 32,700 |
| Wet | 8,500 | 20,100 |
| Modulus, ASTM D-790-49T: | | |
| Dry | 473,000 | 1,050,000 |
| Wet | 281,000 | 765,000 |

Blends varying from 5, 10, 15 parts by weight of all the above listed N-vinyl pyrrolidones per 170 parts of the unsaturated polyester of Example II, when processed in accordance with procedure given in Example II, gave satisfactory glass fiber laminates.

Example III

The following ingredients were loaded into a resin flask, equipped with agitator, thermometer, moisture trap and condenser: 2.1 moles of maleic anhydride, 0.9 mole of phthalic anhydride, 1.1 moles of butanediol and 2.2 moles of propanediol 1,2 with 25 cc. of benzene. The mixture was heated to 150° C. for ¾ hour. Then heated to 160° C. for ¼ hour and held for 1¼ hours. Thereafter it was heated to 170° C. for ½ hour and held for 3 hours. Then heated to 180° C. for 20 minutes and held for 1¼ hours. The acid number of the polyester was 54. It was cooled to 140° C. and vacuum applied to remove the benzene. Then 0.003% of tertiary butyl catechol were added. The polyester was cooled to room temperature and solutions in crosslinking agents prepared having the composition shown in Table III.

¼ inch laminates, 4½ inches by 5⅞ inches were prepared from six layers of 2 ounce fiberglass mat by the following procedure: Over each sheet was uniformly spread the accurately weighed amount of resin corresponding to 60 parts by weight of resin solution and 40 parts of fiberglass mat.

The layers were stacked and pressed between cold platens, at slightly more than contact pressure for 5 minutes in order to expel any trapped air. The lay-ups were then cured between glass slides at a five pounds pressure overnight at 60° C., followed by 1 hour post-cure at 120° C. ½ inch strips were then cut from the laminates and subjected to flexural strength testing. The results obtained are shown in Table 3.

TABLE 3

|  | 1 (Blank Control) | 2 | 3 |
|---|---|---|---|
| Polyester of Example III | 70.0 | 70.0 | 70.0 |
| Styrene | 30.0 | 25.0 | 20.0 |
| N-Vinyl-2-Pyrrolidone |  | 5.0 | 10.0 |
| Tert. Butyl Perbenzoate | 2.0 | 2.0 | 2.0 |
| Flexural Strength ASTM D-790-49T | 15,680 | 21,350 | 21,000 |
| Modulus of Elasticity ASTM D-799-49T | 574,000 | 758,000 | 683,000 |

*Example IV*

A polyester resin was prepared as follows: 1140 grams of 4,4'-isopropylidene bis phenol, 294 grams of maleic anhydride and 25 cc. of benzene were heated in a 1500 cc. resin flask equipped with agitator, thermometer, moisture trap, condenser and GlasCol mantle to 180° C. in one hour. Water began to distill over, and at this point the temperature was raised to 200° C. during one hour and held. After one hour heating to 200° C. the hot resin was moderately viscous. A sample taken out showed that the acid number was approximately 42.5. A total of 31.5 cc. of water was collected. The temperature was lowered to 160° C. and held for one hour. A total of 36.5 cc. of water was collected. The acid number of resin was found to be 34.9. The agitation was continued, and a vacuum of 145 mm. mercury pressure was applied for about 30 minutes. The resin was poured into a pan and allowed to cool and solidify. It was a clear, light amber, hard and brittle product, having an acid number of 33.4. The viscosity of a 50% solution in benzene was about 100 cps. Two parts of the above resin were dissolved in one part of styrene and the solution was divided into six equal portions. Various blends were made, glass laminates prepared as above, and the physical data obtained are shown in Table 4.

die and cured for 10 minutes at 240° F. The results obtained are shown in Table 5.

TABLE 5

|  | 1 (Blank Control) | 2 | 3 |
|---|---|---|---|
| Polyester solution of Example V | 100.0 | 100.0 | 100.0 |
| N-Vinyl-2-Pyrrolidone |  | 10.0 | 5.0 |
| Styrene | 10.0 |  | 5.0 |
| Tert. Butyl Perbenzoate | 2.2 | 2.2 | 2.2 |
| Flexural Strength ASTM D-790-49T: |  |  |  |
| Dry | 28,500 | 33,200 | 37,600 |
| Wet | 28,200 | 31,250 | 31,200 |
| Modulus, ASTM D-790-49T: |  |  |  |
| Dry | 835,000 | 1,030,000 | 1,050,000 |
| Wet | 816,000 | 915,000 | 960,000 |
| Resin Content | 66.2 | 66.7 | 65.8 |
| Glass Content | 33.8 | 33.3 | 34.2 |

From the foregoing examples, it becomes clearly manifest that unsaturated polyesters cross-linked with an N-vinyl pyrrolidone alone or as a mixture with styrene are materially improved with respect to adhesion to glass and glass products.

During our experimental work with the N-vinyl pyrrolidones, we have found that they are applicable to any unsaturated polyester resin obtained by reacting together a polyhydric alcohol and a polybasic acid, either or both of which contain a double bonded pair of carbon atoms, and which have a molecular weight of about 800–3000 and an acid number below 50. The conditions of esterification are those that are normally practiced to arrive at a polyester having long chain molecules containing double bonds. In other words, unsaturated polyesters obtained by esterification of either an unsaturated polybasic acid with a saturated polyhydric alcohol, mixture of saturated and unsaturated polycarboxylic acid with polyhydric alcohols, and polyesters, obtained by esterifying unsaturated polyhydric alcohols with either saturated or unsaturated polycarboxylic acids, or mixtures of unsaturated polycarboxylic with saturated polycarboxylic acids are amenable to cross-linking with either N-vinyl pyrrolidones alone or in admixture with prior art monomers, except vinylpyridines. The esterification of the polyhydric alcohols and polybasic acids and mixtures of unsaturated and saturated polybasic acids is usually carried out with an excess of the polyhydric alcohol which facilitates reduction of the

TABLE 4

| Portion or Sample No. | Polyester-Styrene Solution of Example IV | Additional Styrene Added | Cross-linking Agents Added | Glass Content of cured laminate, Percent | Flexural Strength, ASTM D790-49T | | Modulus, ASTM D790-49T | |
|---|---|---|---|---|---|---|---|---|
|  |  |  |  |  | Dry | Wet | Dry | Wet |
| Standard | 100.0 | 10.0 |  | 44.2 | 36,800 | 32,800 | 1,208,000 | 1,011,000 |
| (1) 317-C | 100.0 |  | 10.0 N-Vinyl-2-Pyrrolidone | 42.7 | 40,400 | 34,200 | 1,219,000 | 1,326,000 |
| (2) 316-E | 100.0 |  | 10.0 N-Vinyl-5-Methyl Pyrrolidone | 41.5 | 40,650 | 37,900 | 1,401,000 | 1,110,000 |
| Standard | 67.4 | 32.6 |  | 41.5 | 32,600 | 31,600 | 1,200,000 | 1,000,000 |
| (3) 327-C | 67.4 | 22.6 | 10.0 N-Vinyl-2-Pyrrolidone | 40.4 | 38,050 | 39,700 | 1,304,500 | 1,331,000 |
| (4) 328-B | 67.4 | 22.6 | 10.0 N-Vinyl-5-Methyl Pyrrolidone | 41.6 | 43,875 | 33,400 | 1,459,000 | 1,250,000 |

*Example V*

A polyester was prepared by condensing one mole of hexachlorcyclopentadiene-maleic anhydride adduct, one mole of maleic anhydride and 2.2 moles of ethylene glycol following the procedure of Example I. The polyester was dissolved in styrene in the ratio of 75 parts resin to 25 parts of styrene.

Into three separate portions of the resin solution, N-vinyl-2-pyrrolidone, styrene, and mixture of N-vinyl pyrrolidone-styrene were added as shown in Table 5. The laminates were prepared as above in a matched metal acid number of the resulting polyester. The unsaturated polycarboxylic acids employed in the copolymerization may constitute the whole of the acid component of the polyester, but usually it is preferred to include at least one or more saturated polycarboxylic acids.

The polyesters cross-linked in accordance with the present invention may be employed in molding operations with or without filler, as laminating agents, as bonding agents, as adhesives, as coating compositions, and the like. In the preparation of moldings or laminated materials, the desired proportion of an N-vinyl pyrrolidone is mixed with the polyester and various fillers of silicate origin such as chopped glass fibers, etc. Wood flour, wood fiber, clay, chalk, steel wool, paper cloth, silica flour, pigments and the like may be added, and the combination molded or laminated by well-known procedures.

We claim:

1. A polymerizable composition having improved adhesion to glass laminates comprising a mixture of an unsaturated polyester having an acid number of 5 to 54 obtained by reacting a dihydric alcohol and a dicarboxylic acid selected from the group consisting of ethylenically unsaturated dicarboxylic acids, ethylenically unsaturated dicarboxylic acid anhydrides and mixtures of ethylenically unsaturated dicarboxylic acids, ethylenically unsaturated dicarboxylic acid anhydrides and saturated dicarboxylic acids, 5 to 20% by weight of said polyester of a polymerizable monomer having the following general formula:

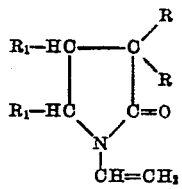

wherein R represents a member selected from the class consisting of hydrogen and methyl groups, and $R_1$ is a member selected from the group consisting of hydrogen, methyl and ethyl groups, and from 10 to 55% by weight of a member selected from the class consisting of styrene, vinyl toluene, acrylonitrile, diallyl phthalate and triallyl cyanurate.

2. A polymerizable composition according to claim 1 wherein the polymerizable monomer is N-vinyl-2-pyrrolidone.

3. A polymerizable composition according to claim 1 wherein the polymerizable monomer is N-vinyl-5-methyl pyrrolidone.

4. A polymerizable composition according to claim 1 wherein the polymerizable monomer is N-vinyl-4-methyl pyrrolidone.

5. A polymerizable composition according to claim 1 wherein the polymerizable monomer is N-vinyl-3,3-dimethyl pyrrolidone.

6. A polymerizable composition according to claim 1 wherein the polymerizable monomer is N-vinyl-4-ethyl pyrrolidone.

References Cited in the file of this patent

UNITED STATES PATENTS

| | | |
|---|---|---|
| 2,600,457 | Wynstra | June 17, 1952 |
| 2,642,410 | Hoppens | June 16, 1953 |
| 2,731,375 | Toulmin | Jan. 17, 1956 |
| 2,831,836 | Forchielli | Apr. 22, 1958 |

OTHER REFERENCES

Schildknecht: "Vinyl and Related Polymers," John Wiley & Sons, Inc., New York (1952), page 678 relied on.